(12) United States Patent
Balmakhtar et al.

(10) Patent No.: US 12,231,893 B2
(45) Date of Patent: Feb. 18, 2025

(54) OPERATING SYSTEM INTEGRITY MEASUREMENT AND ATTESTATION

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 399 days.

(21) Appl. No.: 17/676,225

(22) Filed: Feb. 21, 2022

(65) Prior Publication Data

US 2023/0269588 A1    Aug. 24, 2023

(51) Int. Cl.
*H04W 12/10* (2021.01)
*H04W 12/122* (2021.01)
*H04W 24/10* (2009.01)

(52) U.S. Cl.
CPC ......... *H04W 12/10* (2013.01); *H04W 12/122* (2021.01); *H04W 24/10* (2013.01)

(58) Field of Classification Search
CPC .... H04W 12/10; H04W 12/122; H04W 24/10
See application file for complete search history.

(56) References Cited

U.S. PATENT DOCUMENTS

| | | | |
|---|---|---|---|
| 10,602,353 B1* | 3/2020 | Berdy | H04L 63/0884 |
| 11,509,723 B1* | 11/2022 | Mishra | H04L 69/28 |
| 11,924,060 B2* | 3/2024 | Smith | H04L 67/61 |
| 2020/0021445 A1* | 1/2020 | Caceres | G06F 21/44 |
| 2020/0183588 A1* | 6/2020 | Lee | G06F 3/0649 |
| 2021/0018210 A1* | 1/2021 | Nasis | F24F 11/65 |
| 2022/0116224 A1* | 4/2022 | Guim Bernat | H04L 9/3239 |

* cited by examiner

*Primary Examiner* — Emmanuel L Moise
*Assistant Examiner* — Xiang Yu

(57) ABSTRACT

A method of determining an integrity of an electronic communication device that connects to a 5G core network. The method comprises measuring by an attestation client application executing on the electronic communication device attributes of a universal communication stack (UCS) that executes on the electronic communication device and that promotes communication with the 5G core network; receiving a baseline of UCS attributes comprising norms of UCS attributes and thresholds; comparing measurements of the attributes of the UCS to the baseline by the attestation client application; when the comparisons are within the thresholds, granting communication access by the attestation client application to the 5G core network to a user application that executes on the electronic communication device; and when one of the comparisons exceeds a threshold, denying communication access by the attestation client application to the 5G core network to the user application that executes on the electronic communication device.

20 Claims, 11 Drawing Sheets

OPERATING SYSTEM INTEGRITY MEASUREMENT AND ATTESTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A basic computer system comprises computer hardware, an operating system, and one or more application programs. The computer hardware includes a processor, a memory, a storage device, and one or more system buses that facilitate communication among the various components. The operating system is an interface between applications and the hardware layer of the computer system. The operating system includes various routines that manage the physical components of the computer system and their use by applications.

Computer systems are known to have vulnerabilities to various kinds of cyber-attacks targeting the software of the operating system or the application programs. Attacks can be instituted and delivered over network connections, such as the Internet, but also may come directly from someone with immediate access to a computer system. Computer viruses, worms, and trojan horses are all examples of different forms of cyber-attack. Cyber-attacks are generally implemented by installing unauthorized or malicious code into the programs and causing execution of the foreign code. For example, exploits may be created to force an application to execute code after an exploit has been triggered. The code may be considered a payload which is often prepared in memory before being triggered by the exploit.

SUMMARY

In an embodiment, a method of determining an integrity of a plurality of internet of things (IoT) devices by a communication gateway that connects the IoT devices to a 5G core network is disclosed. The method comprises, for each of the plurality of IoT devices, receiving measurements by an attestation client application executing on the gateway from the IoT device, wherein the measurements are determined by a measurement client application that executes on the IoT device to measure a universal communication stack (UCS) that executes on the IoT device and promotes communication with the 5G core network via the gateway, wherein the UCS comprises a plurality of non-access stratum (NAS) application programming interfaces (APIs), a mobility manager application, a session manager application, a NAS encoder/decoder application, a NAS transport control protocol (TCP encapsulation application, and a plurality of adapters that connect the UCS to an operating system secure communication module that provides a communication link between the IoT device and the gateway and wherein the measurements comprise memory sizes and memory location of NAS APIs, the mobility manager application, the session manager application, the NAS encoder/decoder application, the NAS TCP encapsulation application, and the adapters. The method further comprises building a baseline from the measurements received from the plurality of IoT devices, wherein the baseline comprises normative values of each of the different measurements received and a threshold associated with each of the different measurements, requesting measurements of the UCS from one of the plurality of IoT devices by the attestation client application, and, after requesting measurements of the UCS from the one of the plurality of IoT devices, receiving requested measurements of the UCS by the attestation client application from the one of the plurality of IoT devices. The method further comprises comparing the received requested measurements to the baseline normative values of each of the requested measurements, determining if any of the received requested measurements differ from the normative values of each of the requested measurements by more than the associated thresholds, and when the received requested measurements do not differ from the normative values by more than the associated thresholds, providing a communication link to the one of the plurality of IoT devices to a 5G core network.

In another embodiment, a computer that encapsulates an integrity attestation functionality for connecting to a 5G core network is disclosed. The computer comprises a processor, a first non-transitory memory associated with the processor, and a first universal communication stack (UCS) stored in the first non-transitory memory that, when executed by the processor, promotes communication with the 5G core network and comprises a first plurality of non-access stratum (NAS) application programming interfaces (APIs), a first mobility manager application, a first session manager application, a first NAS encoder/decoder application, a first NAS transport control protocol (TCP encapsulation application. The computer further comprises a first attestation client application stored in the first non-transitory memory that, when executed by the processor, determines measurements of the first UCS stack wherein the measurements of the first UCS stack comprise memory sizes and memory location of NAS APIs, the mobility manager application, the session manager application, the NAS encoder/decoder application, the NAS TCP encapsulation application, and the adapters, receives a first baseline that defines norms of the measurements of the first UCS stack and thresholds associated with the norms of the measurements of the first UCS stack, compares measurements of the first UCS stack to the norms of the measurements of the first UCS stack based on the thresholds associated with the norms of the measurements of the first UCS stack to determine an integrity of the first UCS stack, and transmits a report about the integrity of the first UCS stack. The computer further comprises a network interface card (NIC) processor, a second non-transitory memory associated with the NIC processor, and a second UCS stored in the second non-transitory memory that, when executed by the NIC processor, promotes communication with the 5G core network and comprises a second plurality of NAS APIs, a second mobility manager application, a second session manager application, a second NAS encoder/decoder application, a second NAS transport control protocol (TCP encapsulation application; and a plurality of adapters that interwork with communication security features of an operating system executing on the NIC processor. The computer further comprises a second attestation client application stored in the second non-transitory memory that, when executed by the NIC processor, determines measurements of the second UCS stack, wherein the measurements of the second UCS stack comprise memory sizes and memory location of NAS APIs, the mobility manager application, the session manager application, the NAS encoder/decoder application, the NAS TCP encapsulation application, the adapters, and identities of external communication devices that the NIC processor communicates with, receives a second baseline that defines norms of the measurements of the second UCS stack and thresholds associated with the norms of the measurements of the second UCS stack, compares measurements of the second UCS stack to the norms of measurements of the second UCS stack contained in the second baseline based on the thresholds associated with the norms of the measurements of the second UCS stack contained in the second baseline to determine an integrity of the second UCS stack, and transmits a report about the integrity of the second UCS stack.

In yet another embodiment, a method of determining an integrity of an electronic communication device that connects to a 5G core network is disclosed. The method comprises measuring by an attestation client application executing on the electronic communication device attributes of a universal communication stack (UCS) that executes on the electronic communication device and that promotes communication with the 5G core network, wherein the UCS comprises a plurality of non-access stratum (NAS) application programming interfaces (APIs), a mobility manager application, a session manager application, a NAS encoder/decoder application, a NAS transport control protocol (TCP encapsulation application, and a plurality of adapters that connect the UCS to an operating system secure communication module that provides a communication link between the electronic communication device and the gateway. The method further comprises transmitting the measurements of the attributes of the UCS by the attestation client application to an attestation server application that executes on a computer different from the electronic communication device, wherein the measurements of the attributes of the UCS comprise memory sizes and memory location of NAS APIs, the mobility manager application, the session manager application, the NAS encoder/decoder application, the NAS TCP encapsulation application, and the adapters, receiving a baseline of UCS attributes comprising norms of UCS attributes and thresholds associated with the norms of UCS attributes from the attestation server application, wherein the baseline is produced by the attestation server application based on analyzing measurements of UCS attributes transmitted by a plurality of different electronic communication devices of the same type, and comparing measurements of the attributes of the UCS to the baseline by the attestation client application. The method further comprises, when the comparisons are within the thresholds associated with the norms of the UCS attributes, granting communication access by the attestation client application to the 5G core network to a user application that executes on the electronic communication device, and when one of the comparisons exceeds a threshold associated with the norms of the UCS attributes, denying communication access by the attestation client application to the 5G core network to the user application that executes on the electronic communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
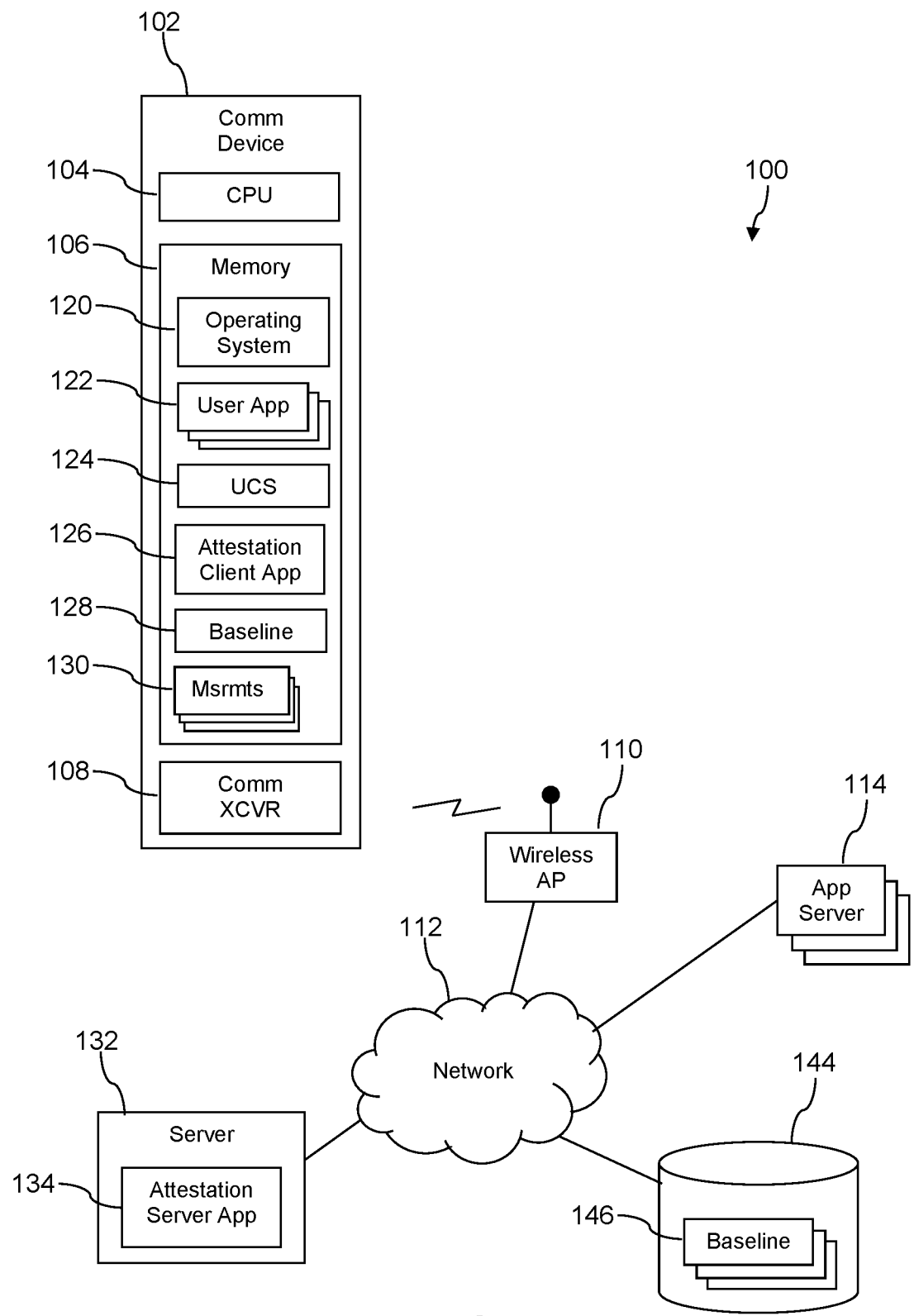
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a framework for providing integrity measurement and attestation in computer systems, including measuring an operating system and a universal communication stack (UCS) of the computer system. The integrity measurement and attestation taught herein provide security against stealthy cyberattacks that are increasing in complexity and consequence. Many conventional computer security approaches focus on monitoring tools executing within an operating system of a computer and often rely on some kind of threat signature scanning. A draw back of this approach is that such monitors only find known cyber threats-they cannot find unknown threats because the signatures of these unknown threats have not yet been defined or identified.

An attestation client application executes on the computer system and captures measurements of operating system artifacts and of the UCS. In some embodiments, the attestation client application further captures measurements and/or data about communication pathways between the computer and a 5G core communication network, for example an untrusted non-3GPP access network communication pathway. The measurements of the OS and UCS and optional data about the communication pathway are stored locally and also transmitted to an attestation server. The attestation server collects the measurements and optional data from a plurality of other computer systems and derives norms and deviation thresholds for the different measurements and data on the pathways, for example using statistical determinations of median values and standard deviations. The norms and deviation thresholds constitute a baseline of measurements and communication pathway data. Different baselines are determined for different classes or types of computer systems, because different norms and thresholds are expected to be associated with different types of computer systems.

The attestation server may receive updates of measurements and pathway data from a computer. The attestation server can compare these updated measurements and communication pathway data to applicable norms and deviation thresholds and determine, thereby, if the integrity of the subject computer system remains intact or if it likely has been corrupted by some sort of cyberattack. Note that this analysis does not rely on a pre-defined signature of an attack but only on a comparison of current state versus prior state of the computer system. If the computer system is deemed to be compliant (e.g., current measurements and communication pathway data are within threshold variance from the norms), it may be said that its integrity is attested.

In an embodiment, baseline data is sent to each computer system associated with the attestation server, and an attestation client application on the computer systems autonomously performs the attestation process. If the attestation client application determines that the computer system has failed the attestation process, it may take action. For example, the client application may send a notification to the attestation server, and the attestation server may take action. For example, the attestation client application may disable communication by non-system applications executing on the computer system with the 5G communication network. In an embodiment, attestation may be performed relatively frequently by the attestation client application and relatively infrequently by the attestation server, whereby to reduce network traffic and to reduce load on the attestation server.

The present disclosure contemplates that the framework for providing integrity measurement and attestation in computer systems may be applied to a diverse range of platforms. For example, it is thought that the framework can be used with laptop computers, server computers, tablet computers, other computers, micro-controllers, and field programmable gate arrays (FPGAs). It is thought that the framework can be used by both a network interface card (NIC) within a server computer and the main processor(s) of the server computer. In an embodiment, a main processor(s) of such a server computer may execute client software for a control plane function (CPF) of a 5G communication session of the server computer while the NIC of the server computer may execute client software for a user plane function (UPF) of the 5G communication session of the server computer. In an embodiment, a gateway may link a plurality of internet of things (IoT) devices to the 5G core network via the untrusted non-3GPP access network. Each of the IoT devices may have an operating system and UCS and communicate with the untrusted non-3GPP network and the 5G core network via the gateway. The attestation client application may execute on the gateway and collect measurements from the IoT devices it links to the untrusted non-3GPP access network.

The integrity assessment and attestation framework disclosed herein provides both efficiencies of computer operation and process benefits. As described briefly above and further below, the framework provides a way to identify integrity lapses in some devices (e.g., IoT devices) which may not have enough processing capacity, memory, or communication bandwidth to autonomously conduct such integrity assessment. Assessing integrity of IoT devices by the gateway may, for example, provide a process benefit by cutting the ability of malware that has infiltrated an IoT device to propagate beyond the IoT device, as it may be identified and thwarted first by the gateway. The integrity assessment and attestation framework provide a system that may identify unusual activity that is not associated with known malware signatures (e.g., a so called zero-day cyber-attack) and mitigate the attack or stop the spread of the attack.

Turning now to FIG. 1, a system 100 is described. In an embodiment, the system 100 comprises a communication device 102 having a processor 104, a memory 106, and a communication transceiver 108. The communication device 102 communicates via the communication transceiver 108 to a network 112, for example via a wireless access point 110 or via a wired link (not shown). The communication device 102 may communicate with an application server 114 to receive some service or retrieve data content. The memory 106 comprises a non-transitory memory portion that stores an operating system 120, one or more user applications 122, a universal communication stack (UCS) 124, and an attestation client application 126. After the attestation client application 126 has executed, the memory 106 may further store a baseline 128 and one or more sets of measurements 130.

The communication device 102 may be a computer system, a server computer, a wearable computer, a headset computer, a laptop computer, a tablet computer, a notebook computer, a micro-controller, or a FPGA. Computers and computer systems are discussed further hereinafter. The network 112 comprises one or more private networks, one or more public networks, or a combination thereof. In an embodiment, the network 112 comprises, at least in part, a 5G core network. 5G networks are discussed further hereinafter. The communication link from the communication transceiver 108 to the network 112 via the wireless AP 110 may be referred to in some contexts as an untrusted non-3GPP communication path and/or access network.

Because the communication device 102 may access the 5G core network encapsulated in the network 112 via an untrusted non-3GPP access network, it is desirable, from the perspective of the 5G core network service provider, to validate the communication device 102 in some way, for example to assure that the operating system and/or UCS of the communication device 102 has not been altered. If the operating system and/or UCS have not been altered, it can be expected that the communication device 102 will identify itself correctly and not spoof the identity of a different device. If the communication device 102 accessed the 5G core network not through an untrusted non-3GPP access network but instead through the 3GPP radio access network (RAN), the robust 3GPP authentication processes would thoroughly validate the identity of the communication device 102 before it would be allowed to attach to the RAN. But this is not the case with the communication device 102. As taught herein, an attestation process is overseen by an attestation server application 134 executing on an attestation server 132 that is communicatively coupled to the network 112. This can provide robust security for the 5G core service provider that provides a 5G communication session to the communication device 102 via the untrusted non-3GPP access network or pathway via the wireless access point 110.

The attestation client application 126 measures attributes of the operating system 120 and of the UCS 124. The measurements of the operating system 120 may comprise information about boot instructions, kernel, device drivers, and libraries. These measurements may comprise a size of these software artifacts stored in memory in bytes, a memory location of the software artifacts in the memory 106 (e.g., a start memory location and end memory location or a plurality of start-end memory location ranges), and a hash of the software artifacts. In an embodiment, the UCS 124 is a bundle of software that can run on any computer, high capacity or low capacity, and supports connecting the computer to the 5G core network. In an embodiment, the UCS 124 comprises a number of libraries of software artifacts.

The UCS 124 takes note of what platform it is executing on and uses components or utilities from the libraries based on the platform it is installed on. The measurements of the UCS 124 may comprise information about one or more of non-access stratum (NAS) application programming interfaces (APIs), a mobility manager, a session manager, a subscriber identity module (SIM) interface, a NAS encoder/decoder module, a NAS transport control protocol (TCP) encapsulation module, a generic routing encapsulation (GRE) encapsulation/decapsulation module, and/or a plurality of adapters that support different security constructs of different operating systems, such as Ubuntu, OpenWRT, and FreeRTOS. These measurements may comprise a size in memory of these UCS 124 components (e.g., a start memory location and an end memory location or a plurality of start-end memory location ranges), a memory location of the software artifacts in the memory 106, and a hash of the software artifacts. The attestation client application 126 may also capture data about communication paths between the communication device 102 and the network 112, for example capturing IP addresses, fully qualified domain names (FQDNs) or other identities of communication nodes between the communication device 102 and the 5G core network within the network 112.

The attestation client application 126 may transmit the measurements of the operating system 120, the measurements of the UCS 124, and the data about the communication paths used by the communication device 102 to the attestation server 132, and the attestation server application 134 may process these measurements and data, along with like measurements and data received from other communication devices, to determine a baseline 146 for the type of communication device to which the communication device 102 belongs. The attestation server application 134 may store this baseline 146 in a data store 144. The attestation server application 134, in an embodiment, works with a variety of different communication devices of different types and may create a plurality of different baselines 146, each different baseline being associated with a different type or category of communication devices.

The baseline 146 comprises norms and thresholds applicable to the different measurements and the different communication paths associated with a type of communication device. The current measurements and current communication paths of the communication device 102 can be compared by the attestation server application 134 and/or by the attestation client application 126 to these norms, in the light of the thresholds, to attest to the integrity of the operating system 120 and UCS 124 of the communication device 102. In other words, this attestation can determine if the operating system 120 and/or UCS 124 have been substantially changed (e.g., changed beyond bounds permitted by the determined thresholds), in which case the communication device 102 may be deemed in-authentic or corrupted or lacking in integrity.

The norms of different measurements may be determined by the attestation server application 134 by finding a median value across a plurality of communication devices 102 of a same type, for example 100 devices, 10,000 devices, 100,000 devices, 1,000,000 devices, 10,000,000 devices, or some other number of like devices. The thresholds can be determined based on determining standard deviations and defining a threshold for each different measurement-plus and minus—in terms of standard deviations. For example, a measurement that exceeds a median measurement value by a standard deviation or more may be deemed indicative of a security breach, or a measurement that exceeds a median measurement by two standard deviations or more may be deemed indicative of a security breach. Likewise, a measurement that falls short of the median measurement value by a standard deviation or more may be deemed indicative of a security breach, or a measurement that falls short of the median by two standard deviations or more may be deemed indicative of a security breach. The thresholds of different measurements may be a different number of standard deviations. For example, a first measurement threshold may be specified to be 1 standard deviation, a second measurement threshold may be specified to be 2 standard deviations, and a third measurement threshold may be specified to be 1.5 standard deviations.

The attestation server application 134 may periodically recalculate the baseline 146, whereby to adapt the baseline 146 automatically to changing communication operations of communication devices 102. For example, the attestation server application 134 may recalculate the baseline 146 every day, once per week, once every two weeks, once per month, or some other periodic interval. The attestation server application 134 may determine the baseline 146 over a most recent sample interval, for example over the last two weeks, over the last three weeks, over the last month, over the last two months, or some other interval of time.

The attestation server application 134 may transmit the baseline 146 that is associated with the type of the communication device 102 to the attestation client application 126, and the attestation client application 126 may store this as a baseline 128 in the non-transitory memory portion of the memory 106. In an embodiment, the attestation client application 126 may complete attestation of current measurements 130 and data collected by the communication device 102 against the thresholds defined by the baseline 128. Because the attestation client application 126 is already collecting measurements 130 and data on communication paths, this information is ready for use. Because the thresholds defined in the baseline 128 are calculated by the attestation server application 134, the attestation client 126 is not heavily burdened by massive amounts of statistical analysis to determine these thresholds. The attestation client application 126 need only compare the current measurements 130 and data on communication pathways to the norms for measurements and communication pathways and see what the differences are relative to the pre-defined thresholds in the baseline 128.

The attestation client application 126 may periodically perform attestation locally (e.g., on the communication device 102) and report a simple pass/fail result to the attestation server application 134. Alternatively, the attestation client application 126 may report nothing in the case of a pass result. The attestation server application 134 may complete an attestation of the communication device 102 with the help of the attestation client application 126 at longer intervals, for example once per month or once per quarter while the attestation client application 126 completes attestation locally once per week or once per month respectively.

If the attestation of the communication device 102 finds one or more attributes that differ from its associated norm by more than permitted by the associated threshold, action may be taken by the attestation server application 134 or by the attestation client application 126. Taking action may comprise sending notification of the failed attestation to an administrator of the system 100, disabling communication by user applications 122 via the communication transceiver 108 to the wireless access point 110, or disabling communication of the entire communication device 102 to the wireless access point 110. In an embodiment, the attestation client application 126 generates a report on the attestation results and sends the report to the attestation server application 134. The report may be said to pertain to an integrity of the operating system 120 and the UCS 124. The report can be made both when the communication device 102 passes attestation and when it fails attestation.

Figure 2:
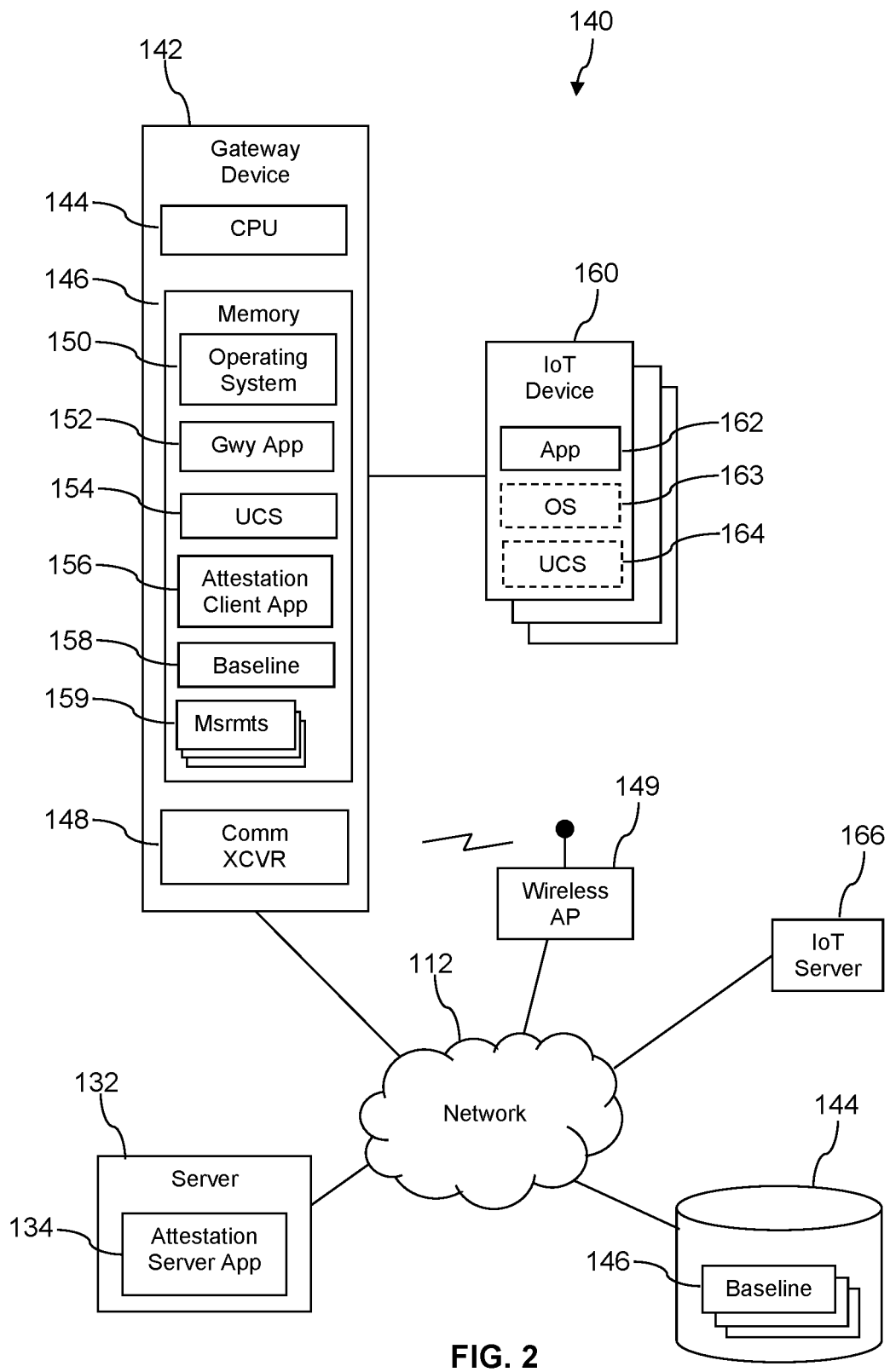
FIG. 2 is a block diagram of another system according to an embodiment of the disclosure.

Turning now to FIG. 2, a system 140 is described. The system 140 of FIG. 2 pertains to a communication system that employs attestation in some ways similar to system 100 of FIG. 1 and in other ways different from the system 100. The system 140 comprises a gateway device 142 that comprises a processor 144, a memory 146, and a communication transceiver 148. The communication transceiver 148 establishes a communication link with the network 112 either directly (e.g., via a wired link) or indirectly via a wireless link to a wireless access point 149 and thence to the network 112. The gateway 160 provides a communication link to one or more internet of things (IoT) devices 160, where each IoT device 160 comprises an application 162, an optional operating system 163 (some simple IoT devices may not have an operating system per se), and an optional UCS 164 that executes on the IoT device 160. The application 162 that executes on the IoT devices 160 pertains to the communication functionality of the IoT devices 160, for example collecting data from a sensor and uploading the sensor data to an IoT server 166 or other functionality.

In an embodiment, the IoT devices 160 may be simple devices that lack the memory capacity to store an attestation client application, a baseline, and measurements and/or the processor capacity to execute both the application(s) 162 and an attestation client application. In another embodiment, the IoT devices 160 may be located where they could be accessed by malefactors while the gateway 142 may be located at a difficult to access location (on top of a tall pole or enclosed in a locked secure container). In an embodiment, the IoT devices 160 may be provided by a first original equipment manufacturer (OEM) and the gateway device 142 may be supplied by a second, different OEM. All of these different circumstances may be reasons to implement attestation of the IoT devices 160 on the gateway device 142 rather than on the IoT devices 160 themselves.

The memory 146 of the gateway 142 comprises a non-transitory portion of memory that stores an operating system 150, a gateway application 152, a UCS 154, an attestation client application 156, a baseline 158, and measurements 159. The gateway application 152, when executed by the processor 144, may provide the communication link from the IoT devices 160 to the network 112. The attestation client application 156 may collect measurements of both the IoT devices 160 and of the gateway 142 and store these in the measurements 159. The measurements of IoT devices 160 may comprise measurements of the operating system 163, if present, may comprise information about boot instructions, kernel, device drivers, and libraries. These measurements may comprise a size of these operating system 163 software artifacts stored in memory in bytes, a memory location of the operating system 163 software artifacts (e.g., a start memory location and end memory location or a plurality of start-end memory location ranges), and a hash of the operating system 163 software artifacts. The measurements of the IoT devices 160 may comprise a size of the UCS 164 components (e.g., a start memory location and an end memory location or a plurality of start-end memory location ranges), a memory location of the UCS 164 software artifacts, and a hash of the UCS 164 software artifacts. The measurements of the gateway device 142 may comprise like measurements of the operating system 150 and of the UCS 154 as well as data about communication paths used by the gateway device 142 to communicate to the network 112 and to the IoT server 166.

The attestation server application 134 may interact with the gateway 142 in a manner similar to that described with reference to FIG. 1 above. That is the attestation server application 134 collaborates with the attestation client application 156 to obtain the measurements 159 and calculates norms and thresholds for attributes of the operating system 150 and UCS 154 of the gateway device 142 but also norms for attributes of the optional operating systems 163 and UCSs 164 of the IoT devices 160. The approach to calculating norms and thresholds for the gateway device 142 and IoT devices 160 may be substantially the same as described above with reference to system 100, for example statistical determination of median values of attributes and standard deviations of attribute values relative to the median values. The attestation server application 134 is in communication with a plurality of gateway devices 142, and the norms and thresholds are calculated based on all the measurements and data on communication pathways received from all these gateway devices 142. The norms and thresholds calculated by the attestation server application 134 are stored as one or more baselines 146 in the data store 144. The attestation server application 134 may send a copy of the relevant baseline 146 to the gateway device 142 to be stored as a baseline 158. The attestation server application 134 may recalculate the baseline of the gateway device 142 and IoT devices 160 periodically. The baseline may be determined by the attestation server application 134 over a most recent sample interval, for example over the last two weeks, over the last three weeks, over the last month, over the last two months, or some other interval of time.

The attestation server application 134 can receive current measurements from the gateway device 142, compare these current measurements to the norms and thresholds of the applicable baseline 146 and if one or more of the measurements provided by the gateway device 142 vary by more than its associated threshold from the norm, the attestation server application 134 may take action. Taking action may comprise excluding the gateway device 142 from connecting to the network 112. Taking action may comprise informing the IoT server 166, and the IoT server 166 may break a communication session with the gateway device 142 or disallow later attempts by the gateway device 142 to initiate a new communication session. Taking action may comprise sending a notification to a responsible party or administrator of the gateway device 142, and the responsible party may follow up further with the gateway device 142. The attestation server application 134 may compare the current measurements of the gateway device 142 to the baseline 146 periodically, for example, once per week, once per month, once per quarter, or some other periodic interval.

In an embodiment, the attestation client application 156 may perform attestation locally, comparing current measurements 159 to the baseline 158. If one or more current measurements vary by more than the associated threshold from the norm defined by the baseline 158, the attestation client application 156 may take action. Taking action may comprise sending a notification of failed attestation to the attestation server application 134, and the attestation server application 134 can take one or more of the actions described above. In an embodiment, the attestation client application 156 performs attestation locally periodically on a first periodic interval and the attestation server application 134 performs attestation periodically at a second periodic interval that is a longer period of time than the first periodic interval. In an embodiment, the attestation client application 156 generates a report on the attestation results and sends the report to the attestation server application 134. The report may be said to pertain to an integrity of the operating system 163, the UCS 164, the operating system 150, and/or the UCS 154. The report can be made both when the communication device gateway device 142 and IoT devices 160 pass attestation and when they fail attestation.

Figure 3:
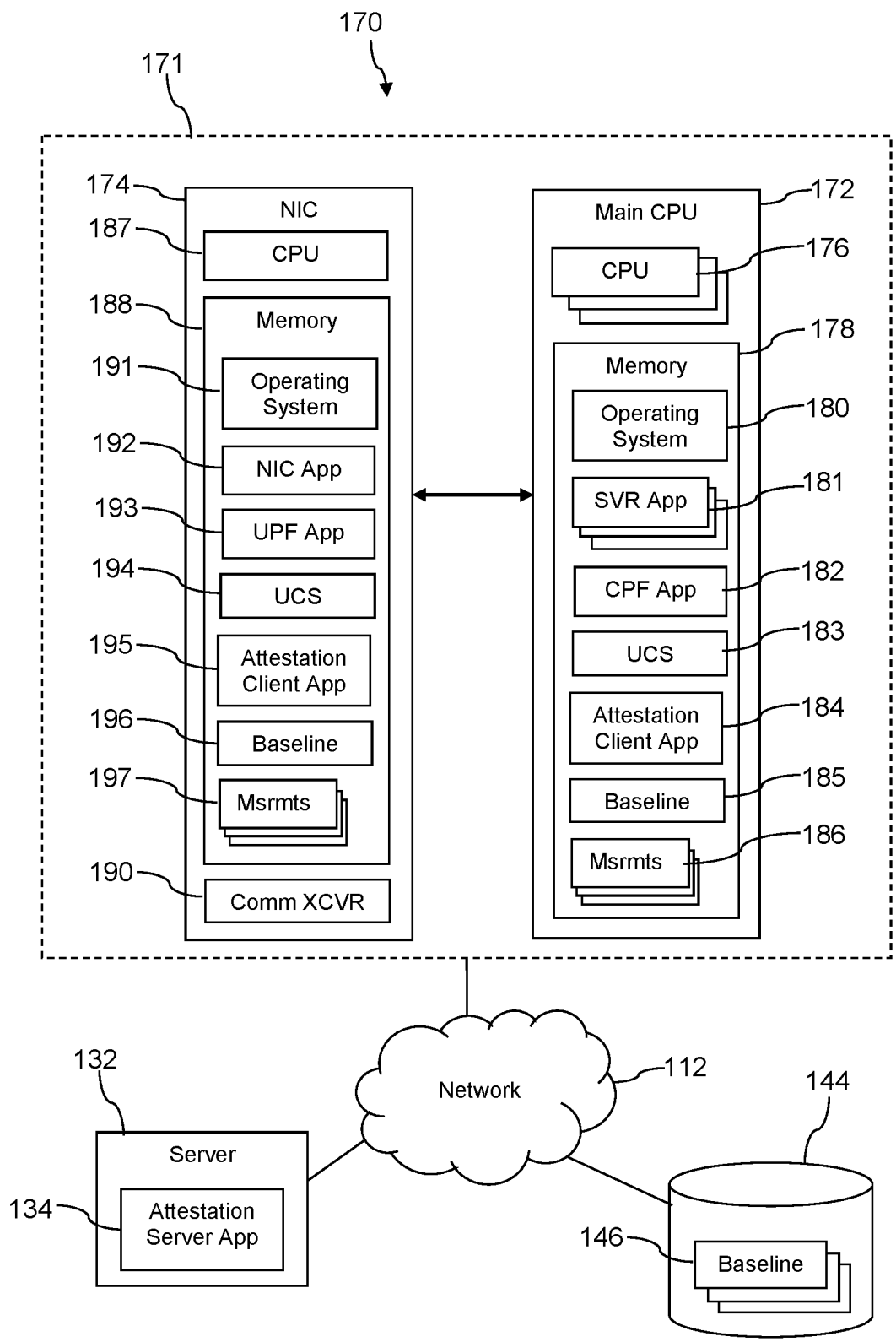
FIG. 3 is a block diagram of yet another system according to an embodiment of the disclosure.

Turning now to FIG. 3, a system 170 is described. The system 170 of FIG. 3 pertains to a communication system that employs attestation in some ways similar to system 100 of FIG. 1 and in other ways different from system 100. The system 170 centers on a server 171 that comprises a main CPU 172 and a network interface card (NIC) 174. The main CPU may comprise one or more processors 176 and a memory 178. The memory 178 comprises a non-transitory memory portion that stores an operating system 180, one or more server application 181, an optional control plane function (CPF) application 182, a UCS 183, an attestation client application 184, a baseline 185, and measurements 186. It is understood that the baseline 185 and the measurements 186 may be stored after the attestation client application 184 has executed.

The NIC 174 comprises a processor 187, a memory 188, and a communication transceiver 190. In some contexts the communication transceiver 190 may be referred to as a modem. Communications from the main CPU 172 to the network 112 and from the network 112 to the main CPU 172 are mediated and/or pass through the NIC 174 and the communication transceiver 190. The memory 188 comprises a non-transitory memory portion that may store an operating system 191, a NIC application 192, an optional user plane function (UPF) application 193, a UCS 194, an attestation client application 195, a baseline 196, and measurements 197. In some contexts, the NIC 174 may be referred to as a "smart NIC," implying that the NIC 174 provides auxiliary processing that is not typically delegated to a NIC in most servers. In most NICs, the NIC only supports network interfacing functions. Here, the NIC 174 optionally performs some application layer function such as the UPF application 193. The NIC application 192 performs customary NIC functions related to network communication. For example, the NIC application 192 may implement a communication stack including a physical layer, a data link layer, an internet protocol (IP) layer, and a transport control protocol (TCP) layer.

The attestation client application 184 in the main CPU 172 collects measurements 186 associated with activities on the main CPU 172. The measurements 186 comprise measurements of operating system 180 artifacts and measurements of the UCS 183. The measurements of the operating system 189 artifacts may comprise information about boot instructions, kernel, device drivers, and libraries. These operating measurements may comprise a size of these software artifacts stored in memory in bytes, a memory location of the software artifacts in the memory 178 (e.g., a start memory location and end memory location or a plurality of start-end memory location ranges), and a hash of the operating system 180 artifacts. The measurements of the UCS 183 may comprise information about one or more of NAS APIs, a mobility manager, a session manager, a SIM interface, a NAS encoder/decoder module, a NAS TCP encapsulation module, a GRE encapsulation/decapsulation module, and/or a plurality of adapters that support different security constructs of different operating systems, such as Ubuntu, OpenWRT, and FreeRTOS. These measurements may comprise a size in memory of these UCS 183 components (e.g., a start memory location and an end memory location or a plurality of start-end memory location ranges), a memory location of the software artifacts in the memory 178, and a hash of the software artifacts.

The attestation client application 195 in the NIC 174 collects measurements 197 associated with activities on the NIC 174. The measurements 197 comprise measurements of operating system 191 artifacts and measurements of the UCS 194. The measurements of the operating system 191 artifacts may comprise information about boot instructions, kernel, device drivers, and libraries. These operating measurements may comprise a size of these software artifacts stored in memory in bytes, a memory location of the software artifacts in the memory 188 (e.g., a start memory location and end memory location or a plurality of start-end memory location ranges), and a hash of the operating system 191 artifacts. The measurements of the UCS 194 may comprise information about one or more of NAS APIs, a mobility manager, a session manager, a SIM interface, a NAS encoder/decoder module, NAS a TCP encapsulation module, a GRE encapsulation/decapsulation module, and/or a plurality of adapters that support different security constructs of different operating systems, such as Ubuntu, OpenWRT, and FreeRTOS. These measurements may comprise a size in memory of these UCS 183 components (e.g., a start memory location and an end memory location or a plurality of start-end memory location ranges), a memory location of the software artifacts in the memory 106, and a hash of the software artifacts. The attestation client application 195 of the NIC 174 may also capture data about communication paths between the server 171 and the network 112, for example capturing IP addresses, fully qualified domain names (FQDNs) or other identities of communication nodes between the server 171 and the 5G core network within the network 112.

The attestation client application 195 may collect the measurements 186 from the main CPU 172 and the measurements 197 from the NIC 174 and transmit measurements 186, 197 to the attestation server application 134. The attestation server application 134 may process these measurements 186, 197—along with like measurements from other servers—to calculate and determine norms for attributes and associated thresholds for the main CPU 172 and other norms for attributes and associated thresholds for the NIC 174 (e.g., it is likely that the norms and associated thresholds determined based on measurements 186 from main CPUs 172 will be different from the norms and associated thresholds determined based on measurements 197 from NICs 174). These norms and associated thresholds may be stored as baselines 146 in the data store 144. The attestation server application 134 may send the baseline associated with the main CPU 172 to be stored in the memory 178 of the main CPU 172 as the baseline 185. The attestation server application 134 may send the baseline associated with the NIC 174 to be stored in the memory 188 of the NIC 174 as the baseline 196. The attestation server application 134 may recalculate the baselines of the main CPU 172 and the NIC 174 periodically. The baselines may be determined by the attestation server application 134 over a most recent sample interval, for example over the last two weeks, over the last three weeks, over the last month, over the last two months, or some other interval of time.

The attestation client application 184 on the main CPU 172 may send current measurements to the attestation server application 134 periodically or as requested by the attestation server application 134. The attestation server application 134 may process these current measurements provided by the attestation client application 184 and compare them to the norms and thresholds of the appropriate baseline 146 (e.g., the baseline 146 associated with main CPUs of servers). If one or more of the measurements provided by the attestation client application 146 differ from the appropriate norm by more than permitted by the associated threshold, the attestation server application 134 may take action. Taking action may be sending notification to an administrator of the server 171 or blocking communications between the server 171 and the network 112 or some other action. In an embodiment, the attestation client application 184 may perform attestation itself by comparing current measurements against the baseline 185 that it stores. If the attestation client application 184 finds that one or more of the current measurements differ from the appropriate norm by more than permitted by the associated threshold, the attestation client application 184 may take action by sending a notification to the attestation server application 134 or to an administrator of the server 171.

The attestation client application 195 of the NIC 174 may send current measurements to the attestation server application 134 periodically or as requested by the attestation server application 134. The attestation server application 134 may process these current measurements provided by the attestation client application 195 and compare them to the norms and thresholds of the appropriate baseline 146 (e.g., the baseline 146 associated with NICs of servers). If one or more of the measurements provided by the attestation client application 195 differ from the appropriate norm by more than permitted by the associated threshold, the attestation server application 134 may take action. Taking action may be sending notification to an administrator of the server 171 or blocking communications between the server 171 and the network 112 or some other action. In an embodiment, the attestation client application 195 may perform attestation itself by comparing current measurements against the baseline 196 that it stores. If the attestation client application 195 finds that one or more of the current measurements differ from the appropriate norm by more than permitted by the associated threshold, the attestation client application 195 may take action by sending a notification to the attestation server application 134 or to an administrator of the server 171. In an embodiment, the attestation client application 184 and/or the attestation client application 195 generate a report on the attestation results and sends the report to the attestation server application 134. The report may be said to pertain to an integrity of the operating system 180, the UCS 183, the operating system 191, and/or the UCS 194. The report can be made both when the communication device server 171 passes attestation and when it fails attestation.

In an embodiment, the attestation client application 195 of the NIC 174 may compare measurements provided by the attestation client application 184 of the main CPU 172 against norms and thresholds associated with the main CPUs and report to the attestation client application 110 if the measurements of the main CPU 172 differ from the norms by more than permitted by the thresholds defined by the baseline for main CPUs—in effect, "tattling" on the main CPU 172. Likewise, in an embodiment, the attestation client application 184 of the main CPU 172 may compare measurements provided by the attestation client application 195 of the NIC 174 against norms and thresholds associated with the NICs and report to the attestation server application 134 if the measurements of the NIC 174 differ from the norms by more than permitted by the thresholds defined by the baseline for NICs 174—in effect, "tattling" on the NIC 174.

Figure 4A:
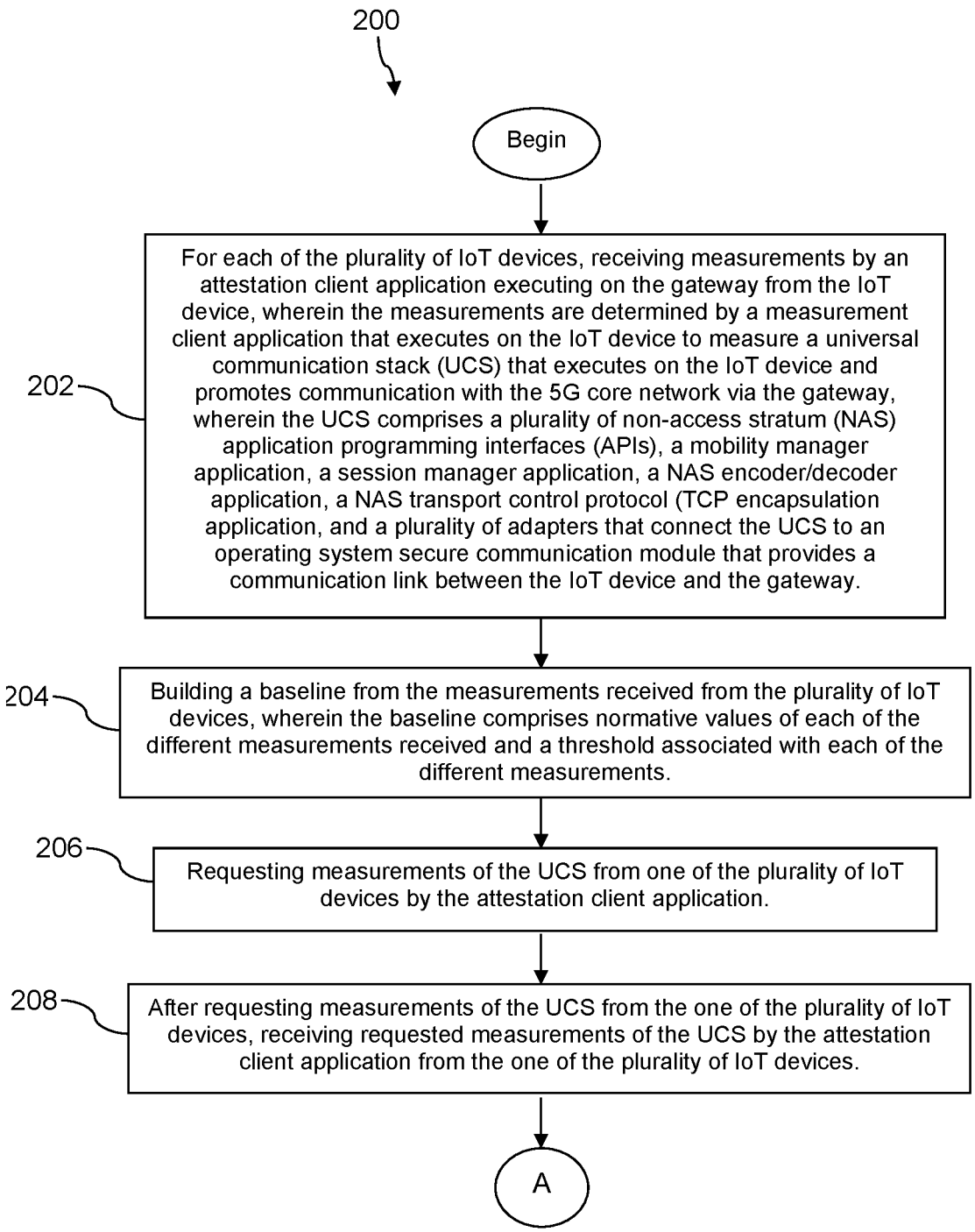
FIG. 4A and FIG. 4B are a flow chart of a method according to an embodiment of the disclosure.
Figure 4B:
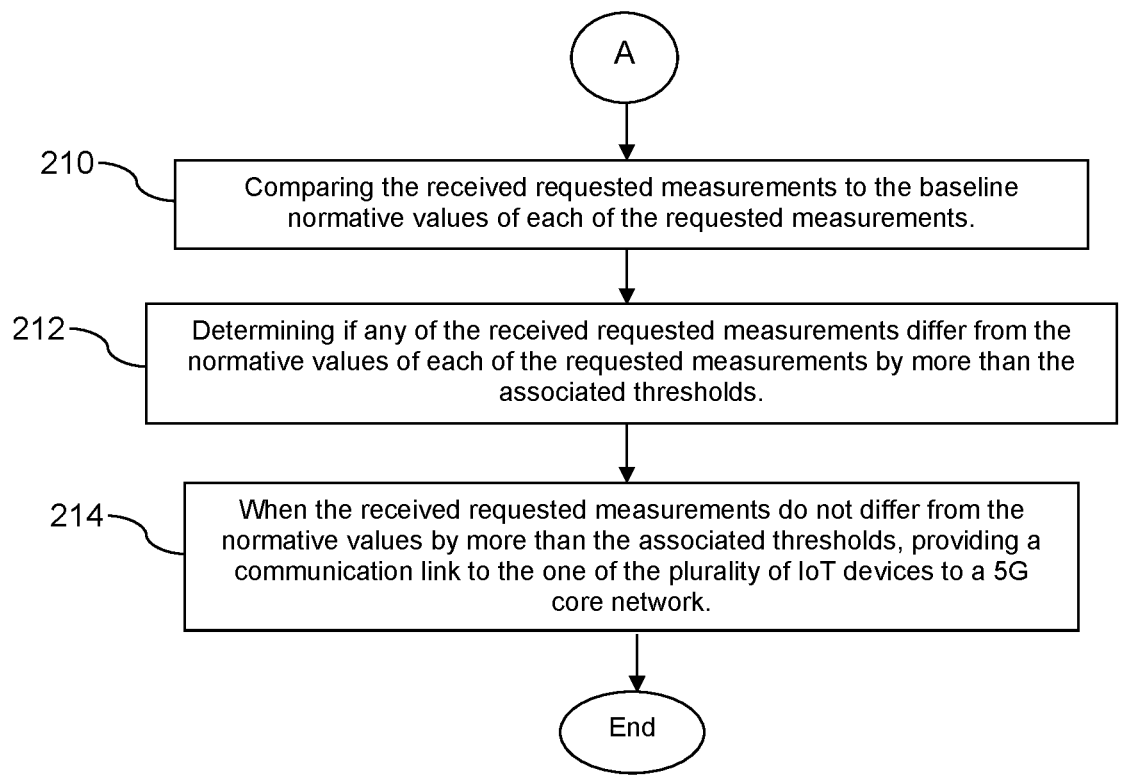

Turning now to FIG. 4A and FIG. 4B, a method 200 is described. In an embodiment, the method 200 is a method of determining an integrity of a plurality of internet of things (IoT) devices by a communication gateway that connects the IoT devices to a 5G core network. At block 202, the method 200 comprises, for each of the plurality of IoT devices, receiving measurements by an attestation client application executing on the gateway from the IoT device, wherein the measurements are determined by a measurement client application that executes on the IoT device to measure a universal communication stack (UCS) that executes on the IoT device and promotes communication with the 5G core network via the gateway, wherein the UCS comprises a plurality of non-access stratum (NAS) application programming interfaces (APIs), a mobility manager application, a session manager application, a NAS encoder/decoder application, a NAS transport control protocol (TCP encapsulation application, and a plurality of adapters that connect the UCS to an operating system secure communication module that provides a communication link between the IoT device and the gateway. In an embodiment, the measurements comprise memory sizes and memory location of NAS APIs, the mobility manager application, the session manager application, the NAS encoder/decoder application, the NAS TCP encapsulation application, and the adapters. In an embodiment, the measurement client application that executes on the IoT device further comprise measurements of an operating system of the IoT device and provides these operating system measurements to the attestation client application. The operating system measurements comprise sizes of artifacts of the operating system (e.g., size in bytes) and/or memory locations of the artifacts of the operating system in a memory of the IoT device. In some cases, an IoT device may not actually have a traditional operating system as such, and hence, in this case, the measurements provided by the measurement application executing on the IoT device would not include measurements of an operating system.

At block 204, the method 200 comprises building a baseline from the measurements received from the plurality of IoT devices, wherein the baseline comprises normative values of each of the different measurements received and a threshold associated with each of the different measurements. In an embodiment, the baseline is built by the attestation server application 134 executing on the server 132 based on measurements received from the plurality of IoT devices 160 monitored by the gateway device 142 and a plurality of IoT devices monitored by other like gateway devices. In an embodiment, the baseline is built by the attestation server application 134 based on measurements received from only the IoT devices 160 monitored by the one gateway device 142. In an embodiment, the baseline is built by the attestation client application 156 executing on the gateway device 142 based on measurements received only from the IoT device 160 monitored by the gateway device 142. In an embodiment, the method 200 comprises sending the baseline by the attestation server application to the attestation client application. The normative values may be determined as median values by the attestation server application and the thresholds are expressed in terms of standard deviations from the median values, for example a threshold of 0.75 standard deviation, a threshold of 1 standard deviation, a threshold of 1.5 standard deviations, a threshold of 2 standard deviations, or some other amount of standard deviations.

At block 206, the method 200 comprises requesting measurements of the UCS from one of the plurality of IoT devices by the attestation client application. At block 208, the method 200 comprises, after requesting measurements of the UCS from the one of the plurality of IoT devices, receiving requested measurements of the UCS by the attestation client application from the one of the plurality of IoT devices. In an embodiment, the processing of block 206 may further comprise requesting measurements of the operating system from one of the plurality of IoT devices by the attestation client application. In this case, the processing of block 208 may further comprise receiving requested measurements of the operating system by the attestation client application from the one of the plurality of IoT devices.

At block 210, the method 200 comprises comparing the received requested measurements to the baseline normative values of each of the requested measurements. At block 212, the method 200 comprises determining if any of the received requested measurements differ from the normative values of each of the requested measurements by more than the associated thresholds. At block 214, the method 200 comprises, when the received requested measurements do not differ from the normative values by more than the associated thresholds, providing a communication link to the one of the plurality of IoT devices to a 5G core network. In an embodiment, when the received requested measurements of an IoT device differs from at least one normative value by more than the associated threshold, method 200 further comprises denying a communication link to the IoT device by the gateway. In an embodiment, when the received requested measurements of an IoT device differs from at least one normative value by more than the associated threshold, method 200 further comprises sending a notification by the gateway to an attestation server application executing on an attestation server. In an embodiment, when the received requested measurements of an IoT device differs from at least one normative value by more than the associated threshold, method 200 further comprises sending a notification by the gateway to an administrator of the gateway. In an embodiment, when the received requested measurements of an IoT device differs from at least one normative value by more than the associated threshold, method 200 further comprises logging is performed by the attestation client application and/or by the attestation server application. This logging information may be provided by the attestation client application to the attestation server application. The attestation server application may consolidate this logging information with like logging information from other gateways and feed this logging information into a machine learning tool to develop criteria and/or thresholds of norms that can be used to predict or identify when an IoT device has been compromised (e.g., when the UCS and/or operating system of the IoT device has been altered).

Figure 5A:
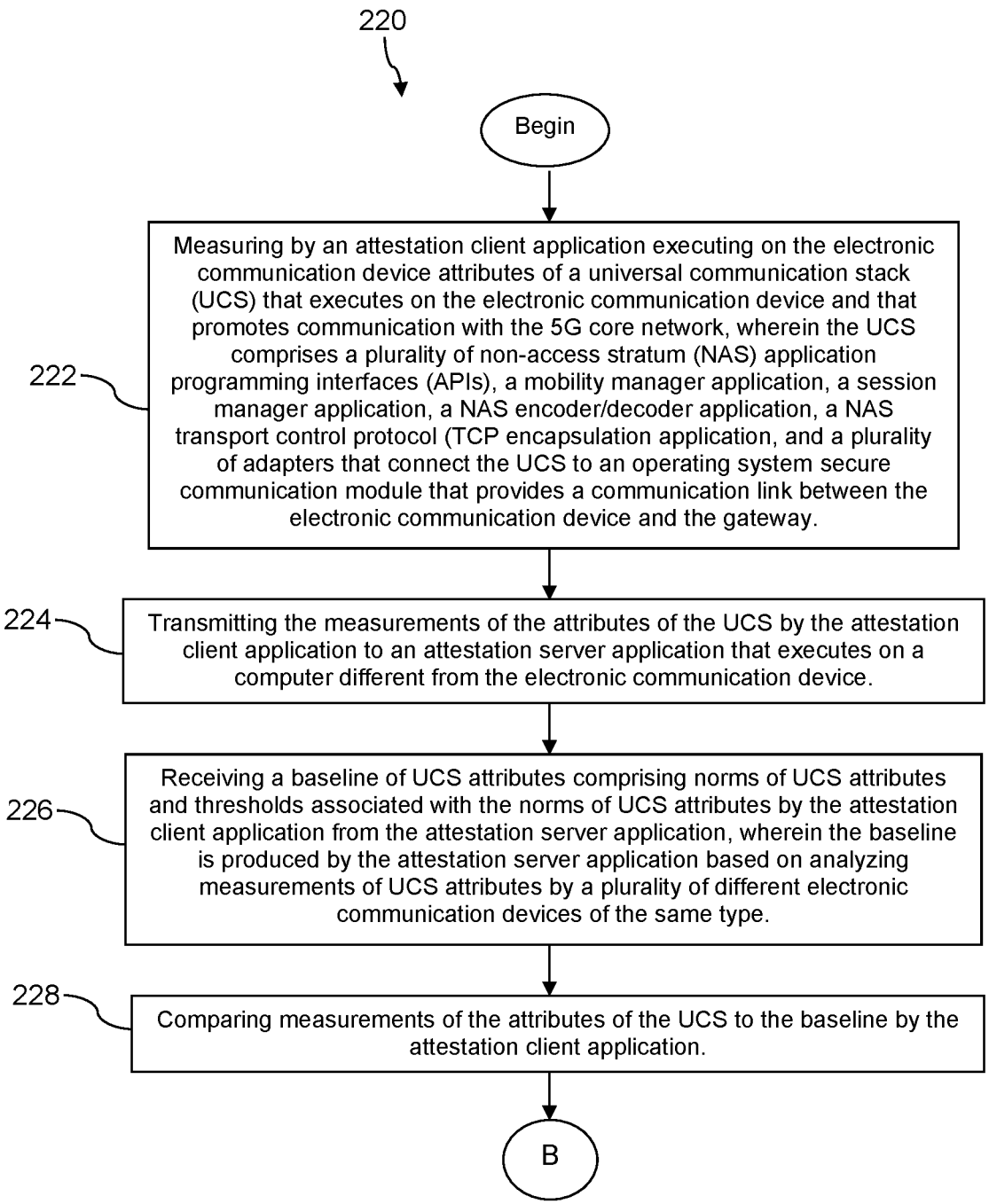
FIG. 5A and FIG. 5B are a flow chart of another method according to an embodiment of the disclosure.
Figure 5B:
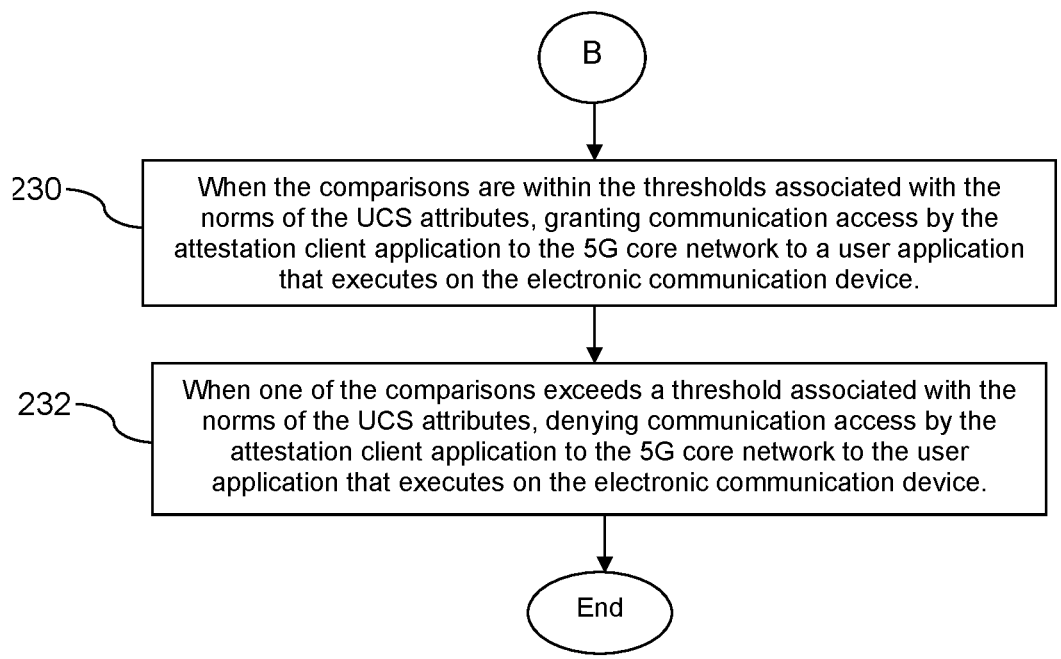

Turning now to FIG. 5A and FIG. 5B, a method 220 is described. In an embodiment, the method 220 is a method of determining an integrity of an electronic communication device that connects to a 5G core network. In an embodiment, the electronic communication device is a computer system, a server computer, a wearable computer, a headset computer, a laptop computer, a tablet computer, a notebook computer, a micro-controller, or a field programmable gate array (FPGA). At block 222, the method 220 comprises measuring by an attestation client application executing on the electronic communication device attributes of a universal communication stack (UCS) that executes on the electronic communication device and that promotes communication with the 5G core network, wherein the UCS comprises a plurality of non-access stratum (NAS) application programming interfaces (APIs), a mobility manager application, a session manager application, a NAS encoder/decoder application, a NAS transport control protocol (TCP encapsulation application, and a plurality of adapters that connect the UCS to an operating system secure communication module that provides a communication link between the electronic communication device and the gateway. In an embodiment, the measurements of the attributes of the UCS comprise memory sizes and memory location of NAS APIs, the mobility manager application, the session manager application, the NAS encoder/decoder application, the NAS TCP encapsulation application, and the adapters. In an embodiment, the processing of block 222 further comprises measuring by the attestation client application attributes of an operating system of the electronic communication device.

At block 224, the method 220 comprises transmitting the measurements of the attributes of the UCS by the attestation client application to an attestation server application that executes on a computer different from the electronic communication device. In an embodiment, the processing of block 224 further comprises transmitting the measurements of the operating system by the attestation client application to the attestation server application. At block 226, the method 220 comprises receiving a baseline of UCS attributes comprising norms of UCS attributes and thresholds associated with the norms of UCS attributes by the attestation client application from the attestation server application, wherein the baseline is produced by the attestation server application based on analyzing measurements of UCS attributes transmitted by a plurality of different electronic communication devices of the same type. In an embodiment, the attestation server application periodically produces the baseline based on recently received measurements, and the attestation client application receives the baseline of UCS attributes periodically from the attestation server application, whereby the baseline of UCS attributes is adapted automatically to changing communication operations of like electronic communication devices. In an embodiment, the baseline may further comprise norms and thresholds associated with an operating system.

At block 228, the method 220 comprises comparing measurements of the attributes of the UCS to the baseline by the attestation client application. In an embodiment, the processing of block 228 may comprise comparing measurements of the attributes of the operating system to the baseline by the attestation client application. At block 230, the method 220 comprises, when the comparisons are within the thresholds associated with the norms of the UCS attributes, granting communication access by the attestation client application to the 5G core network to a user application that executes on the electronic communication device. In an embodiment, the processing of block 230 grants communication access by the attestation client application to the 5G core network to a user application when the measurements of the comparisons of the measurements of the operating system to the norms of the operating system attributes are within the thresholds defined by the baseline. In an embodiment, granting communication access by the attestation client application comprises communicatively coupling the electronic communication device to a network via a non-3GPP wireless communication link. At block 232, the method 220 comprises, when one of the comparisons exceeds a threshold associated with the norms of the UCS attributes, denying communication access by the attestation client application to the 5G core network to the user application that executes on the electronic communication device. In an embodiment, exceeding a threshold associated with a norm of the UCS attributes comprises a measurement greater than the norm by more than the threshold amount or a measurement less than the norm by more than the threshold amount. In an embodiment, when a threshold associated with a norm of UCS attributes or a norm of operating system attributes, logging is performed by the attestation client application to the attestation server application. The attestation server application may feed the logging information from the subject communication device and other like communication devices into a machine learning tool to develop criteria and/or thresholds of norms that can be used to predict or identify when a communication device has been compromised (e.g., when the UCS and/or operating system of the communication device has been altered). In a like manner, exceeding a threshold associated with a norm of the operating system attributes comprises a measurement of an operating system attribute that differs from the norm by more than the threshold amount or by less than the threshold amount.

Figure 6A:
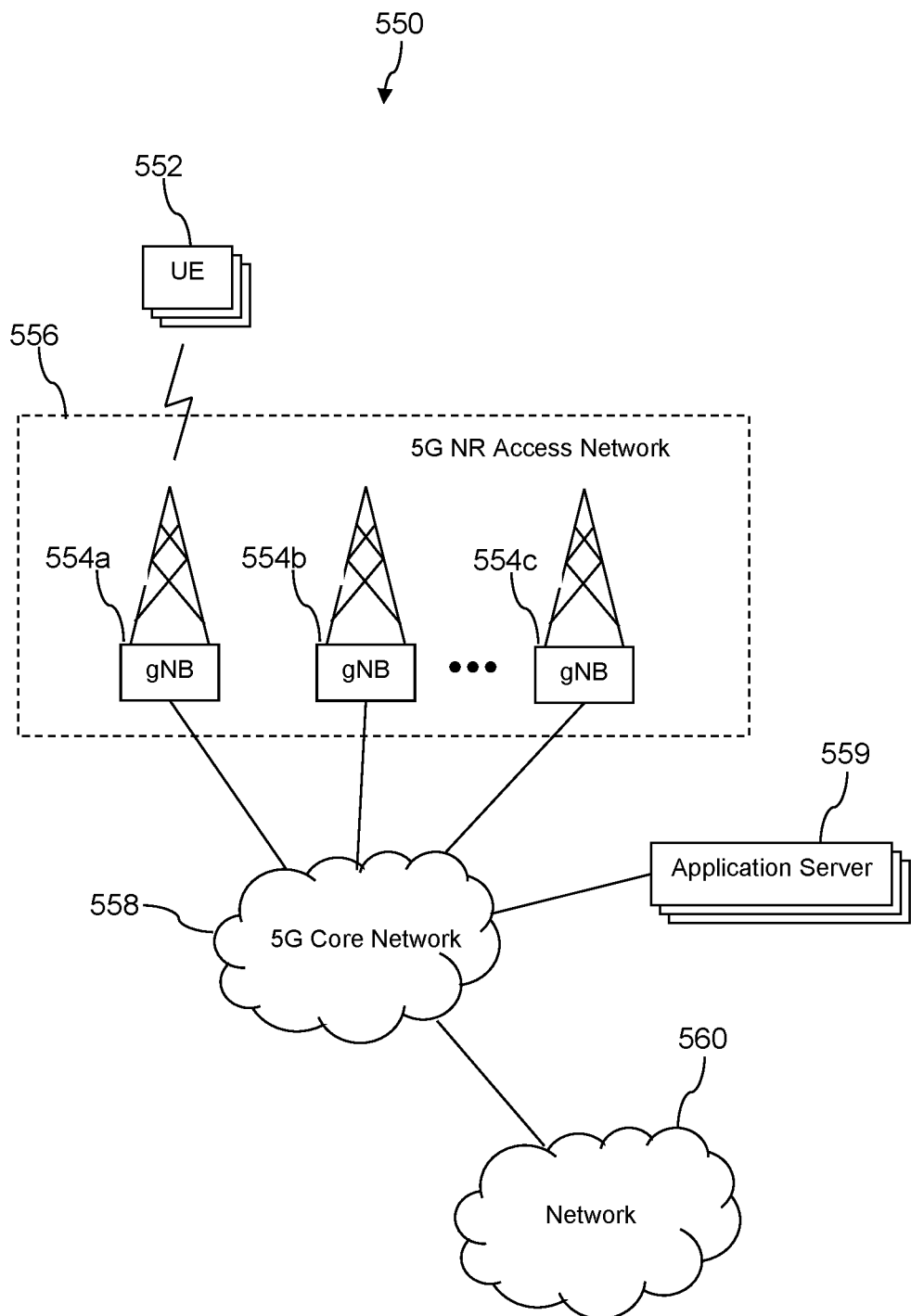
FIG. 6A, FIG. 6B, and FIG. 6C are a block diagram of a 5G communication network according to an embodiment of the disclosure.

Turning now to FIG. 6A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
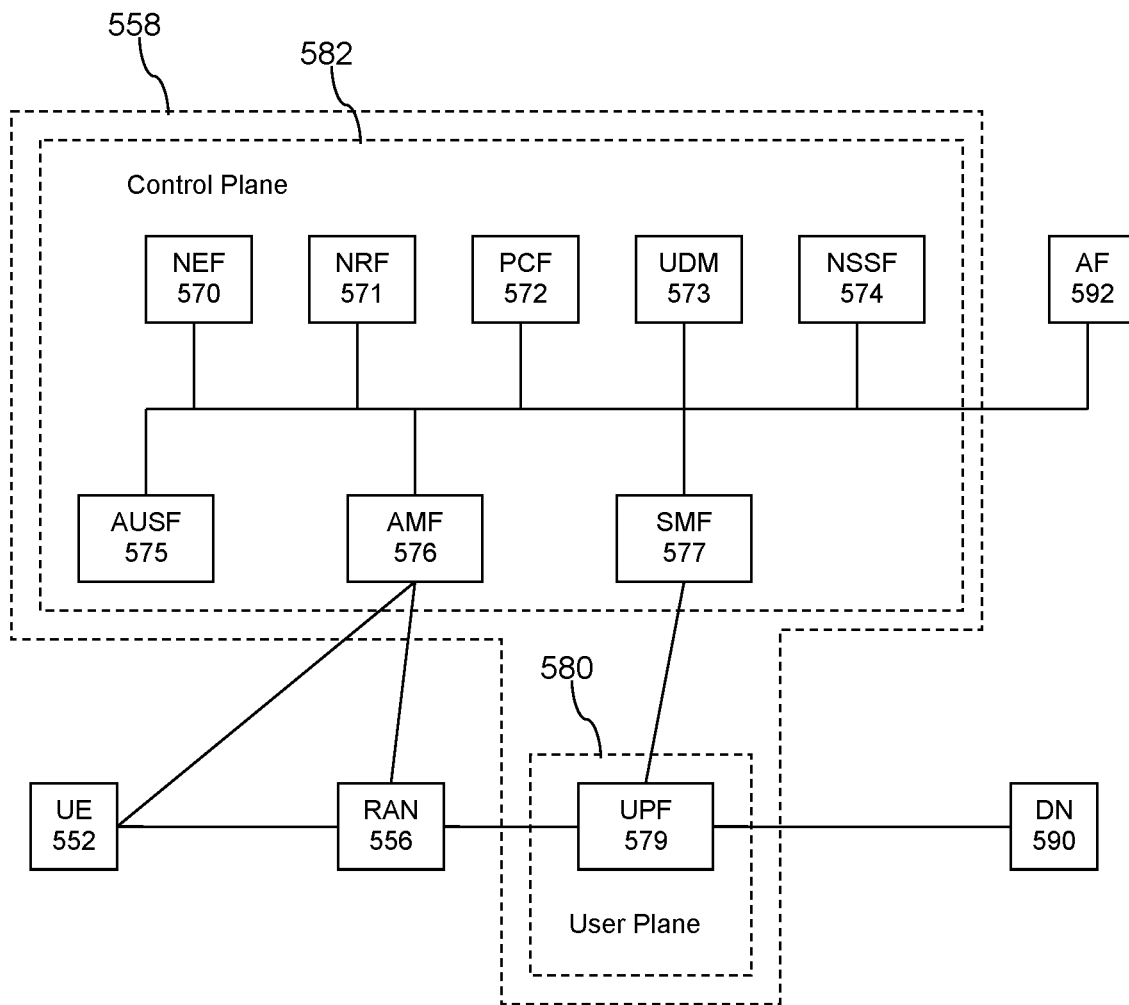

Turning now to FIG. 6B, further details of the core network 558 are described. In an embodiment, the core network 558 is a 5G core network. 5G core network technology is based on a service-based architecture paradigm. Rather than constructing the 5G core network as a series of special purpose communication nodes running on dedicated server computers, the 5G core network is provided as a set of services or network functions. For example, an HSS node of an earlier generation communication network may be replaced in the 5G core network 558 by a unified data management (UDM) network function, and an MME node of an earlier generation communication network may be replaced in the 5G core network by an access and mobility management function (AMF) network function. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6C:
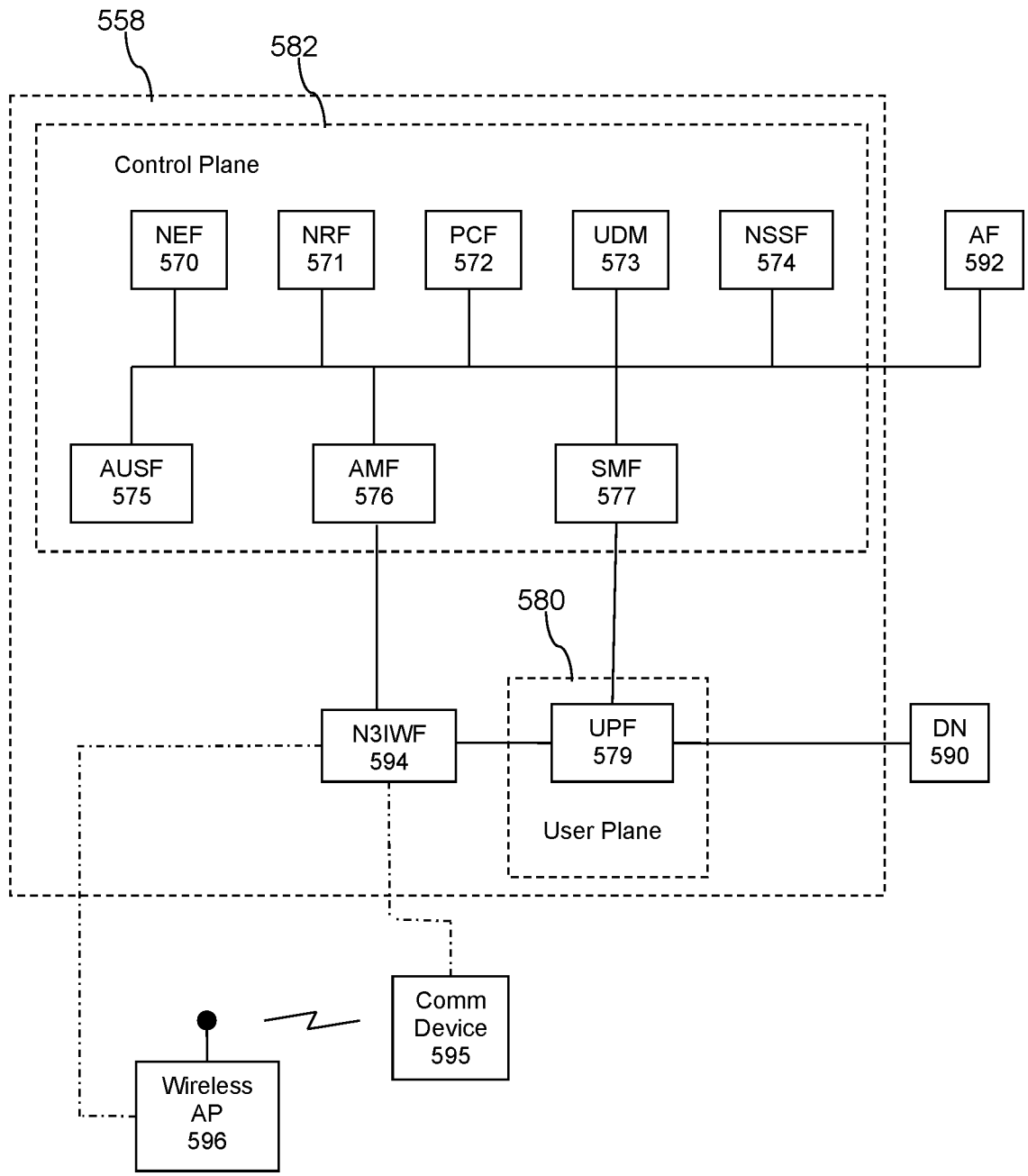

Turning now to FIG. 6C, an alternative communication path into the core network 558 is described. In an embodiment, a communication device 595 that is not able to connect to the core network 558 via an access node 554 and/or the radio access network 556 connects to the core network 558 via an N3 interworking function (N3IWF) 594. The communication device 595 may have a wired communication link to the N3IWF 594 or the communication device 595 may have a wireless link to a wireless access point 596, and the wireless access point 596 may provide a communication link to the N3IWF to the communication device 595. The N3IWF 594 may provide communications coupling to the AMF 576 and to the UPF 579. In some contexts, the communication device 595 may be referred to as a non-3GPP device.

Figure 7:
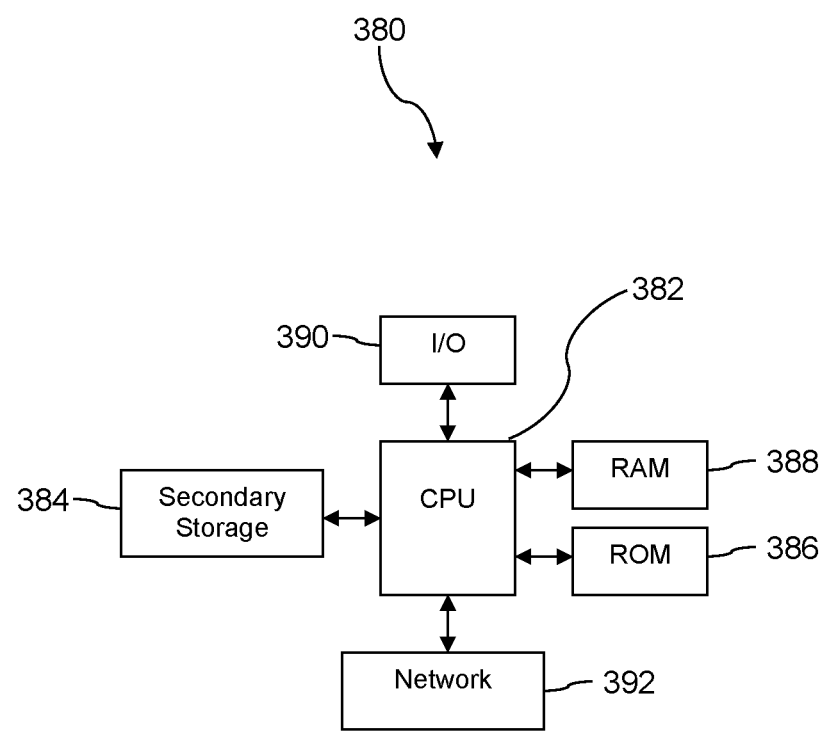
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of determining an integrity of a plurality of internet of things (IoT) devices by a communication gateway that connects the IoT devices to a 5G core network, comprising:

for each of the plurality of IoT devices, receiving measurements by an attestation client application executing on the gateway separate from an IoT device,
wherein the measurements are determined by a measurement client application that executes on the IoT device to measure a universal communication stack (UCS) that executes on the IoT device and supports connecting the IoT device with the 5G core network via the gateway,
wherein the UCS comprises a plurality of non-access stratum (NAS) application programming interfaces (APIs), a mobility manager application, a session manager application, a NAS encoder/decoder application, a NAS transport control protocol (TCP) encapsulation application, and a plurality of adapters, each of which use communication security features of an operating system executing on the IoT device to provide a communication link between the IoT device and the gateway, and
wherein the measurements comprise memory sizes and memory locations of each of the NAS APIs, the mobility manager application, the session manager application, the NAS encoder/decoder application, the NAS TCP encapsulation application, and the adapters of the UCS;
building, by an attestation server application executing on a server separate from the gateway, a baseline from the measurements received from the plurality of IoT devices, wherein the baseline comprises normative values of each of the measurements received and a threshold associated with each of the measurements;
requesting current measurements of the UCS from one of the plurality of IoT devices by the attestation client application;

after requesting the current measurements of the UCS from the one of the plurality of IoT devices, receiving the current measurements of the UCS by the attestation client application from the one of the plurality of IoT devices;

comparing the current measurements to the normative values of each of the current measurements indicated in the baseline;

determining whether at least one of the current measurements differ from the normative values of each of the current measurements by more than a threshold associated with the current measurement; and when the current measurements do not differ from the normative values of each of the current measurements by more than the threshold associated with the current measurement, providing a communication link to the one of the plurality of IoT devices to a 5G core network using the UCS.

2. The method of claim 1, wherein building the baseline from the measurements received from the plurality of IoT devices further comprises sending the baseline by the attestation server application to the attestation client application.

3. The method of claim 2, wherein the normative values are determined as median values by the attestation server application and the thresholds are expressed in terms of standard deviations from the median values.

4. The method of claim 1, further comprising, when the current measurements of the one of the plurality of IoT devices differs from at least one normative value by more than the associated threshold, denying a communication link to the one of the plurality of IoT devices by the gateway.

5. The method of claim 1, further comprising, when the current measurements of the one of the plurality of IoT devices differs from at least one normative value by more than the associated threshold, sending a notification by the gateway to an attestation server application executing on an attestation server.

6. The method of claim 1, further comprising, when the current measurements of the one of the plurality of IoT devices differs from at least one normative value by more than the associated threshold, sending a notification by the gateway to an administrator of the gateway.

7. The method of claim 1, wherein the IoT devices comprise a micro-controller.

8. A computer that encapsulates an integrity attestation functionality for connecting to a 5G core network, comprising:

a processor;

a first non-transitory memory associated with the processor;

a first universal communication stack (UCS) stored in the first non-transitory memory that, when executed by the processor, supports connecting the processor with the 5G core network and comprises a first plurality of non-access stratum (NAS) application programming interfaces (APIs), a first mobility manager application, a first session manager application, a first NAS encoder/decoder application, a first NAS transport control protocol (TCP) encapsulation application, and a first plurality of adapters, each of which interwork with first communication security features of a first operating system executing on the processor to provide a first communication link between the processor and the 5G core network;

a first attestation client application stored in the first non-transitory memory that, when executed by the processor:

determines measurements of the first UCS, wherein the measurements of the first UCS comprise memory sizes and memory locations of each of the first NAS APIs, the first mobility manager application, the first session manager application, the first NAS encoder/decoder application, the first NAS TCP encapsulation application, and the first adapters of the first UCS, receives, from an attestation server application executing on a server separate from the computer, a first baseline that defines norms of the measurements of the first UCS and thresholds associated with the norms of measurements of the first UCS, compares current measurements of the first UCS to the norms of the measurements of the first UCS included in the first baseline based on the thresholds associated with the norms of the measurements of the first UCS included in the first baseline to determine an integrity of the first UCS, and transmits, to an attestation server, a report about the integrity of the first UCS to determine a first action to perform based on the integrity of the first UCS; and a network interface card (NIC) processor;

a second non-transitory memory associated with the NIC processor;

a second UCS stored in the second non-transitory memory that, when executed by the NIC processor, supports connecting the computer with the 5G core network and comprises a second plurality of NAS APIs, a second mobility manager application, a second session manager application, a second NAS encoder/decoder application, a second NAS transport control protocol (TCP) encapsulation application, and a second plurality of adapters, each of which interwork with second communication security features of a second operating system executing on the NIC processor to provide a second communication link between the NIC processor and the 5G core network; and a second attestation client application stored in the second non-transitory memory that, when executed by the NIC processor:

determines measurements of the second UCS, wherein the measurements of the second UCS comprise memory sizes and memory of each of the second NAS APIs, the second mobility manager application, the second session manager application, the second NAS encoder/decoder application, the second NAS TCP encapsulation application, the second adapters, and identities of external communication devices that the NIC processor communicates with;

receives, from the attestation server application, a second baseline that defines norms of the measurements of the second UCS and thresholds associated with the norms of the measurements of the second UCS, compares current measurements of the second UCS to the norms of the measurements of the second UCS included in the second baseline based on the thresholds associated with the norms of the measurements of the second UCS included in the second baseline to determine an integrity of the second UCS, and transmits, to an attestation server, a report about the integrity of the second UCS to determine a second action to perform based on the integrity of the second UCS.

9. The computer of claim 8, wherein the first attestation client application sends the measurements of the first UCS stack to the second attestation client application, the second attestation client application sends the measurements of the first UCS stack and the measurements of the second UCS stack to the attestation server application, the second attestation client application receives the first baseline and the second baseline from the attestation server application and sends the first baseline to the first attestation client application.

10. The computer of claim 9, wherein the first baseline is determined by the attestation server application based on measurements of UCS stacks from a plurality of first attestation clients and the second baseline is determined by the attestation server application based on measurements of UCS stacks from a plurality of second attestation clients.

11. The computer of claim 8, wherein the norms of the measurements of the first UCS stack are determined as first median values, the norms of the measurements of the second UCS stack are determined as second median values, the thresholds associated with the measurements of the first UCS stack are determined as standard deviations from the first median values, and the thresholds associated with the measurements of the second UCS stack are determined as standard deviations from the second median values.

12. The computer of claim 8, wherein the first attestation client application determines measurements of a first operating system stored in the first non-transitory memory, wherein the first baseline defines norms of the measurements of the first operating system and thresholds associated with the norms of the measurements of the first operating system, the first attestation client application compares the measurements of the first operating system to the norms of the measurements of the first operating system contained in the first baseline based on the thresholds associated with the norms of the measurements of the first operating system contained in the first baseline.

13. The computer of claim 8, wherein the report about the integrity of the first UCS stack and the report about the integrity of the second UCS stack are transmitted to an administrator associated with the computer, whereby the integrity of the first UCS stack and the second UCS stack are attested.

14. The computer of claim 8, wherein the NIC processor is a smart NIC.

15. A method of determining an integrity of an electronic communication device that connects to a 5G core network, comprising:
measuring, by an attestation client application executing on the electronic communication device, attributes of a universal communication stack (UCS) that executes on the electronic communication device and that promotes communication with the 5G core network,
wherein the UCS comprises a plurality of non-access stratum (NAS) application programming interfaces (APIs), a mobility manager application, a session manager application, a NAS encoder/decoder application, a NAS transport control protocol (TCP encapsulation application, and a plurality of adapters, each of which use communication security features of an operating system executing on the electronic communication device to provide a communication link between the electronic communication device and the gateway;
transmitting measurements of the attributes of the UCS by the attestation client application to an attestation server application that executes on a computer different from the electronic communication device,
wherein the measurements of the attributes of the UCS comprise memory sizes and memory locations of each of the NAS APIs, the mobility manager application, the session manager application, the NAS encoder/decoder application, the NAS TCP encapsulation application, and the adapters of the UCS;
receiving, from an attestation server application executing on a server separate from the electronic communication device, a baseline of UCS attributes comprising norms of UCS attributes and thresholds associated with the norms of UCS attributes by the attestation client application from the attestation server application, wherein the baseline is produced by the attestation server application based on analyzing measurements of UCS attributes transmitted by a plurality of different electronic communication devices of the same type;
comparing current measurements of the attributes of the UCS to the baseline by the attestation client application;
when the current measurements of the attributes of the UCS are within the thresholds associated with the norms of the UCS attributes indicated in the baseline, granting communication access by the attestation client application to the 5G core network to a user application that executes on the electronic communication device using the UCS; and
when one of current measurements of the attributes of the UCS exceeds a threshold associated with the norms of the UCS attributes indicated in the baseline, denying communication access by the attestation client application to the 5G core network to the user application that executes on the electronic communication device.

16. The method of claim 15, wherein the attestation client application receives the baseline of UCS attributes periodically from the attestation server application, whereby the baseline of UCS attributes is adapted automatically to changing communication operations of like electronic communication devices.

17. The method of claim 15, wherein granting communication access by the attestation client application comprises communicatively coupling the electronic communication device to a network via a non-3GPP wireless communication link.

18. The method of claim 15, wherein the electronic communication device is a computer system, a server computer, a wearable computer, a headset computer, a laptop computer, a tablet computer, or a notebook computer.

19. The method of claim 15, wherein the electronic communication device is one of a micro-controller and a field programmable gate array.

20. The method of claim 15, wherein exceeding a threshold amount associated with a norm of the UCS attributes comprises a measurement greater than the norm by more than the threshold amount or a measurement less than the norm by more than the threshold amount.

* * * * *